United States Patent
Xu et al.

(10) Patent No.: US 8,778,567 B1
(45) Date of Patent: Jul. 15, 2014

(54) UNIQUE PRE-FORM DESIGN FOR TWO-STEP FORMING OF STAINLESS STEEL FUEL CELL BIPOLAR PLATES

(71) Applicant: GM Global Technology Operations LLC, Detroit, MI (US)

(72) Inventors: Siguang Xu, Rochester Hills, MI (US);
Steven J. Spencer, Rochester, NY (US);
John R. Bradley, Clarkston, MI (US);
Gerald W. Fly, Geneseo, NY (US);
Arianna T. Morales, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

(21) Appl. No.: 13/724,505

(22) Filed: Dec. 21, 2012

(51) Int. Cl.
*H01M 8/00* (2006.01)
*H01M 8/02* (2006.01)
*H01M 8/10* (2006.01)

(52) U.S. Cl.
CPC .......... *H01M 8/0247* (2013.01); *H01M 8/1006* (2013.01); *H01M 8/0263* (2013.01)
USPC .......................................... 429/535; 429/457

(58) Field of Classification Search
CPC .. Y02E 60/50; H01M 8/1006; H01M 8/0206; H01M 8/0263; H01M 8/0247
USPC ................................................... 429/457, 535
See application file for complete search history.

(56) References Cited

U.S. PATENT DOCUMENTS

| | | | |
|---|---|---|---|
| 8,089,027 B2 * | 1/2012 | Newman et al. | 219/121.64 |
| 8,663,863 B2 * | 3/2014 | Erikstrup | 429/457 |
| 2004/0048134 A1 * | 3/2004 | Kihira et al. | 429/34 |
| 2006/0147784 A1 * | 7/2006 | Kihira et al. | 429/34 |
| 2011/0129756 A1 * | 6/2011 | Erikstrup | 429/457 |
| 2012/0264033 A1 * | 10/2012 | Frederiksen et al. | 429/470 |

* cited by examiner

*Primary Examiner* — Stewart Fraser
(74) *Attorney, Agent, or Firm* — Dinsmore & Shohl LLP (57) ABSTRACT

A bipolar plate used in a fuel cell and a method of making a bipolar plate. The sheet is made from a ferritic or austenitic stainless steel, and defines an undulated surface pattern such that the patterned sheet may be formed into the bipolar plate. In one configuration, a stamping or related metal forming tool operation will further deform the patterned sheet into the bipolar plate shape such that the wall thickness is substantially uniform throughout the surface. In this way, there is a substantial reduction in stretching/thinning/necking at an intersection between bends and side walls that define the undulations of the pattern. In one form, the pattern defines a repeating serpentine shape. In a particular embodiment, the bends may include surface modifications to reduce the effects of sheet-to-tool misalignment.

22 Claims, 7 Drawing Sheets

UNIQUE PRE-FORM DESIGN FOR TWO-STEP FORMING OF STAINLESS STEEL FUEL CELL BIPOLAR PLATES

BACKGROUND OF THE INVENTION

The present invention relates generally to a stainless steel alloy bipolar plate for use in a fuel cell environment that exhibits ease of manufacturability, and more particularly to such a bipolar plate that is easy and inexpensive to manufacture while preserving the best mechanical/structural properties possible.

In many fuel cell systems, hydrogen or a hydrogen-rich gas is supplied through a flowpath to the anode side of a fuel cell while oxygen (such as in the form of atmospheric oxygen) is supplied through a separate flowpath to the cathode side of the fuel cell. An appropriate catalyst (for example, platinum) is typically disposed to form on these respective sides an anode to facilitate hydrogen oxidation and as a cathode to facilitate oxygen reduction. From this, electric current is produced with high temperature water vapor as a reaction byproduct. In one form of fuel cell, called the proton exchange membrane or polymer electrolyte membrane (in either event, PEM) fuel cell, an electrolyte in the form of an ionomer membrane is situated between the anode and cathode to form a membrane electrode assembly (MEA) which is further layered between diffusion layers that allow both gaseous reactant flow to and electric current flow from the MEA. The aforementioned catalyst layer may be disposed on or as part of the diffusion layer or the membrane.

To increase electrical output, individual fuel cell units are stacked with bipolar plates disposed between the diffusion layer and anode electrode of one MEA and the diffusion layer and cathode electrode of an adjacent MEA. Typically, the bipolar plates are made from an electrically-conductive material in order to form an electrical pathway between the MEA and an external electric circuit. In such a stacked configuration, the bipolar plates separating adjacently-stacked MEAs have opposing surfaces each of which include flow channels separated from one another by raised lands. The channels act as conduit to convey hydrogen and oxygen reactant streams to the respective anode and cathode of the MEA, while the lands, by virtue of their contact with the electrically conductive diffusion layer that is in turn in electrical communication with current produced at the catalyst sites, act as a transmission path for the electricity generated in the MEA. In this way, current is passed through the bipolar plate and the electrically-conductive diffusion layer.

Because the bipolar plate operates in a high temperature and corrosive environment, conventional metals, such as plain carbon steel, may not be suitable for certain applications (such as in automotive environments) where long life (for example, about 10 years with 6000 hours of life) is required. During typical PEM fuel cell stack operation, the proton exchange membranes are at a temperature in the range of between about 75° C. and about 175° C., and at a pressure in the range of between about 100 kPa and 200 kPa absolute. Under such conditions, plates made from alloyed metals such as stainless steel may be advantageous, as they have desirable corrosion-resistant properties. In situations where cost of fuel cell manufacture is an important consideration, metal-based bipolar plates may be preferable to other high-temperature, electrically conductive materials, such as graphite. In addition to being relatively inexpensive, stainless steel plates can be formed into relatively thin members (for example, between 0.1 and 1.0 millimeters in thickness).

Of the various types of stainless steels, those with ferritic microstructures, which typically have a high chromium content and are typically devoid of nickel, exhibit body-centered cubic (BCC) crystal structure and tend to have the desirable attributes of being relatively low cost and high in corrosion resistance (the latter due to chromium oxide barrier formation). Nevertheless, their hardening curves are such that they are more susceptible to necking, stretching, thinning and consequent cracking when exposed to conventional stamping or related one-step metal-forming operations than their more conventional (for example, 304 stainless steel) counterparts. These difficulties are especially prevalent in single-step deep-draw operations (for example, those involving relative large—such as between about 300 microns and 400 microns in depth—out-of-plane deformations) where significant side wall deformation may take place. This early necking and fracture is especially prevalent in tight radii used to form the adjacent walls of the reactant flow channels. While the hardening curves of other more formable stainless steels (such as the aforementioned austenitics) generally allows for the more harsh bending conditions imposed by the conventional one-step approach, early necking and fracture from such single-step forming is also prevalent in situations where the draw depth is comparatively large (such as between about 400 and 500 microns, or more).

Moreover, current bipolar plate manufacturing accounts for high portion of overall fuel cell stack cost. While using stamped stainless steel bipolar plates would be beneficial in addressing a significant portion of this cost, the low formability of stainless steel in general (and ferritic stainless steel in particular) is a significant challenge, especially for stamping very thin (for example, 0.100 millimeters or thinner) sheets that are possessive of the required channel strength and depth to satisfy functional requirements.

To improve the formability of thin stainless steel sheet, a hydro-forming process could be used. Nevertheless, such a process is slow, and requires expensive special equipment that would make it hard to meet either the required production rate or production cost. Likewise, electro-magnetic forming could be used, but is a process that is still under development and not suitable for low-cost mass production.

BRIEF SUMMARY OF THE INVENTION

According to an aspect of the present invention, a method of forming a stainless steel bipolar plate for a fuel cell is disclosed. The method includes a two-step (i.e., progressive) process of providing a pre-formed sheet of stainless steel to a plate forming tool, where the pre-formed sheet is possessive of a nominal thickness. The tool (which in one form may be a pair of cooperatively-shaped dies made to come together under pressure) can form the final shape of the bipolar plate and (if appropriately configured with the necessary dies) also be used to prepare the pre-formed sheet. The first step changes the shape of a generally flat sheet into an undulated pre-formed sheet to better define the shapes that will—upon formation in the second step—form the flow channels and lands that make up the bipolar plate. By the present pre-forming step, selective movement of the material making up the thickness of the sheet will help ensure that a maximum deviation from the nominal thickness as a result of the shape-changing operation is kept to a minimum. In this way, undue necking, stretching or thinning that accompanies conventional forming processes (such as the aforementioned one-step forming process) is avoided. As will be discussed in more detail below, in one form, such thickness deviation may be kept to an amount no more than about 20% for ferritic stainless steels using draw depths of about 365 microns. By the present invention, the thickness deviation exhibits significant reductions compared to conventional one-step approaches that use the same material, the same nominal sheet thickness and the same depth of draw. Reasons for this include (1) the preform die (which in one particular form may be generally V-shaped) bends/deforms the sheet at the land that gives definition to the channel, where the material otherwise cannot get enough plastic deformation in the one-step forming, (2) the V-shaped preform design increases the sheet length of line before the sheet goes into the final form die while keeping the thickness change of the V-shaped straight wall uniform and minimal, and (3) the apexes in the bent areas of the preform tend to feed additional metal to the bending radii in the final form, thus reducing the stretching/pulling of the metal from the wall area of the final form. These features all help move the metal in a favorable way and form a deeper channel with less thinning and necking.

According to another aspect of the invention, a method of forming a ferritic stainless steel bipolar plate is disclosed. The method includes forming a substantially planar sheet or sheet of ferritic stainless steel into an undulated pattern shape, and then forming that shape into a bipolar plate such that upon creation of the plate, the wall thickness is substantially constant; in this way, there is a substantial reduction in deviation from the nominal thickness compared to that used by the one-step approach of the prior art. Both the substantially planar sheet and the pre-formed serpentine pattern define a nominal thickness; this thickness is substantially constant throughout at least the portion of the sheet's surface that will end up corresponding to the bipolar plate.

According to yet another aspect of the invention, a method of preparing a fuel cell is disclosed. The method includes arranging an MEA to comprise an anode, a cathode and a membrane disposed between the anode and cathode such that a respective anode reactant and cathode reactant may be placed in fluid communication therewith. In addition, the method includes placing one or more stainless steel bipolar plates formed by (a) providing a pre-formed sheet of stainless steel defined by a nominal thickness and a plurality of reactant channel flowpaths therein, and (b) changing the shape of the pre-formed sheet such that a maximum deviation from the nominal thickness as a result of one or both operations is substantially reduced relative to formation of a bipolar plate from a forming process of the prior art. In one form, the shape changing takes place by operation of a bipolar plate forming apparatus (such as the aforementioned tool) where pre-shaped dies may stamp or otherwise form the intermediate and final shapes.

It will be appreciated by those skilled in the art that other components may make up the fuel cell, such as one or more gas diffusion layers (GDLs) that may be placed between the respective electrodes (i.e., anodes and cathodes) and the bipolar plates to provide one or both of a reactant flowpath and an electrical current path to an external load-consuming circuit. Likewise, it will be appreciated that functions shared by the GDLs and electrodes may be combined into hybrid structure. Thus, for example, the catalytic material may be formed on either or both of the GDL and a substrate used to define the anode and cathode. Furthermore, placement of the bipolar plate adjacent the anode or cathode may include having the respective GDL placed therebetween such that the outwardly-projecting lands of the bipolar plate are in intermediate contact with the electrodes via direct contact between the plate and the GDL on one side and the anode or cathode and the GDL on the other side. Within the present context, so long as such indirect contact maintains all of the reactant flow attributes between the plate and the respective electrodes, it is deemed to be adjacent.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
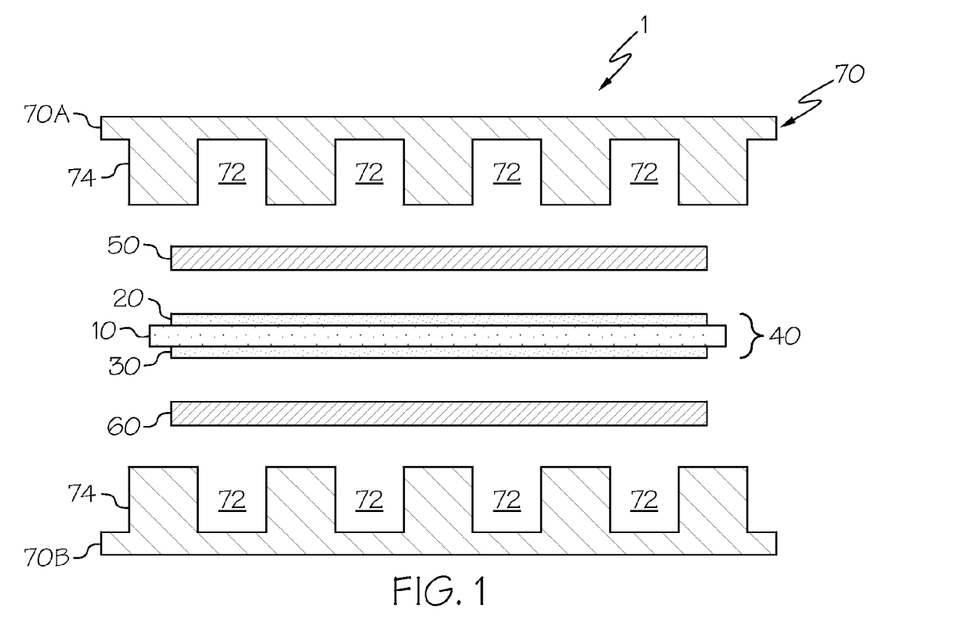
FIG. 1 is an illustration of a partially exploded, sectional view of a portion of a fuel cell with surrounding bipolar plates.

Referring initially to FIG. 1, a partial, sectional view of a conventional PEM fuel cell 1 in exploded form is shown. The fuel cell 1 includes a substantially planar proton exchange membrane 10, anode catalyst layer 20 in facing contact with one face of the proton exchange membrane 10, and cathode catalyst layer 30 in facing contact with the other face. Collectively, the proton exchange membrane 10 and catalyst layers 20 and 30 are referred to as the MEA 40. An anode diffusion layer 50 is arranged in facing contact with the anode catalyst layer 20, while a cathode diffusion layer 60 is arranged in facing contact with the cathode catalyst layer 30. Each of diffusion layers 50 and 60 are made with a generally porous construction to facilitate the passage of gaseous reactants to the catalyst layers 20 and 30. Collectively, anode catalyst layer 20 and cathode catalyst layer 30 are referred to as electrodes, and can be formed as separate distinct layers as shown, or in the alternate (as mentioned above), as embedded at least partially in diffusion layers 50 or 60 respectively, as well as embedded partially in opposite faces of the proton exchange membrane 10.

In addition to providing a substantially porous flowpath for reactant gases to reach the appropriate side of the proton exchange membrane 10, the diffusion layers 50 and 60 provide electrical contact between the electrode catalyst layers 20, 30 and a bipolar plate 70 (through lands 74) that in turn acts as a current collector. Moreover, by its generally porous nature, the diffusion layers 50 and 60 also form a conduit for removal of product gases generated at the catalyst layers 20, 30. Furthermore, the cathode diffusion layer 60 generates significant quantities of water vapor in the cathode diffusion layer. Such feature is important for helping to keep the proton exchange membrane 10 hydrated. Water permeation in the diffusion layers can be adjusted through the introduction of small quantities of polytetrafluoroethylene (PTFE) or related material.

Simplified opposing surfaces 70A and 70B of a pair of bipolar plates 70 are provided to separate each MEA 40 and accompanying diffusion layers 50, 60 from adjacent MEAs and layers (neither of which are shown) in a stack. One plate 70A engages the anode diffusion layer 50 while a second plate 70B engages the cathode diffusion layer 60. Each plate 70A and 70B (which upon assembly as a unitary whole would make up the bipolar plate 70) defines numerous reactant gas flow channels 72 along a respective plate face. Lands 74 separate adjacent sections of the reactant gas flow channels 72 by projecting toward and making direct contact with the respective diffusion layers 50, 60. Although bipolar plate 70 is shown (for stylized purposes) defining purely rectangular reactant gas flow channels 72, it will be appreciated by those skilled in the art that a more accurate (and preferable) embodiment will be shown below in conjunction with FIGS. 4 and 6, where generally serpentine-shaped channels 172, 272 (along with their respective generally planar apexes 173, 273) are formed.

In operation, a first gaseous reactant, such as hydrogen, is delivered to the anode 20 side of the MEA 40 through the channels 72 from plate 70A, while a second gaseous reactant, such as oxygen (typically in the form of air) is delivered to the cathode 30 side of the MEA 40 through the channels 72 from plate 70B. Catalytic reactions occur at the anode 20 and the cathode 30 respectively, producing protons that migrate through the proton exchange membrane 10 and electrons that result in an electric current that may be transmitted through the diffusion layers 50 and 60 and bipolar plate 70 by virtue of contact between the lands 74 and the layers 50 and 60.

Figure 2:
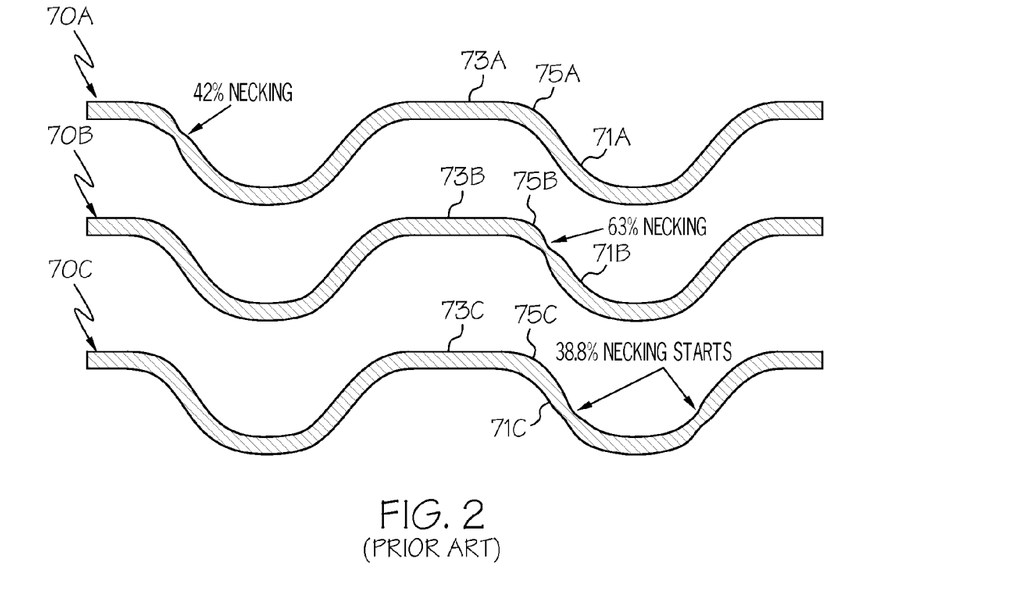
FIG. 2 is side elevation view of one side of a bipolar plate made in accordance with the prior art with one-step forming of 75 micron ferritic sheets shows necking failure.

Referring next to FIG. 2, the results of forming three commercially-available stainless steel sheets 70A, 70B and 70C into bipolar plates 70 according to the conventional one-step prior art approach are shown. In each of the three (all of which define a generally continuous surface profile made up of generally straight side walls 71A, 71B and 71C separated by bends 73A, 73B and 73C, respectively), the stainless steel sheets are ferritic, and about 75 microns thick, while the die draw depth is set to 365 microns. It will be appreciated by those skilled in the art that different bipolar plate designs may dictate other thicknesses, and that typical values are between about 350 and 400 microns. As can be seen, significant necking occurs at the intersections 75A, 75B and 75C between the corresponding side walls 71A, 71B and 71C and bends 73A, 73B and 73C, where the first sheet 70A exhibits about 42% necking (i.e., thinning), the second sheet 70B exhibits about 63% necking and the third sheet 70C exhibits about 38% necking. Likewise, in comparable tests where the draw depth was set to 350 (rather than 365) microns, the necking (which is a measure of the thickness deviation) was 34.4%, 38% and 41.3%, respectively.

In either event, such unacceptably high levels of thinning or stretching may lead to fracture, especially for ferritic stainless steels, which are particularly prone due to their lower hardening curve than that of austenite or other stainless steels. The present inventors are likewise aware that a similar high likelihood of fracturing or weakening (neither of which are shown) will occur with the generally more robust austenitic stainless steels in situations where the draw depth may be greater (such as above about 400 microns). Thus, while much of the present disclosure is especially useful for ferritic stainless steels, it will be appreciated by those skilled in the art that the invention discussed herein is also applicable to austenitic stainless steels, particularly in those situations where larger (i.e., 400 microns or greater) draw depths may be required.

Figure 3:
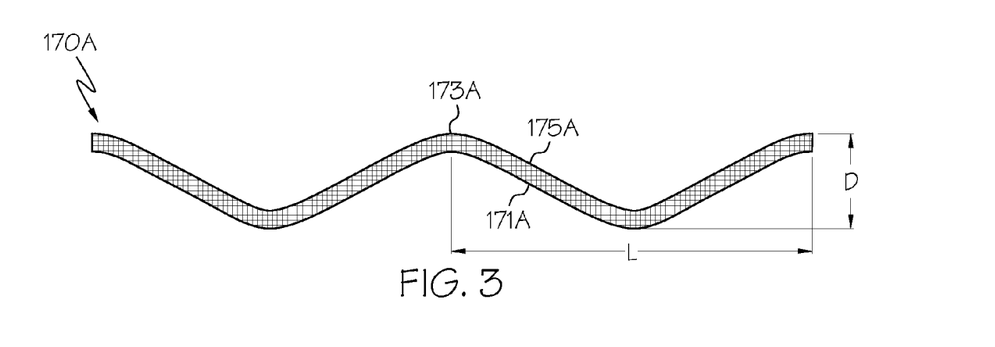
FIG. 3 is side elevation view of a pre-formed sheet prior to being formed into a bipolar plate in accordance with the present invention.
Figure 4:
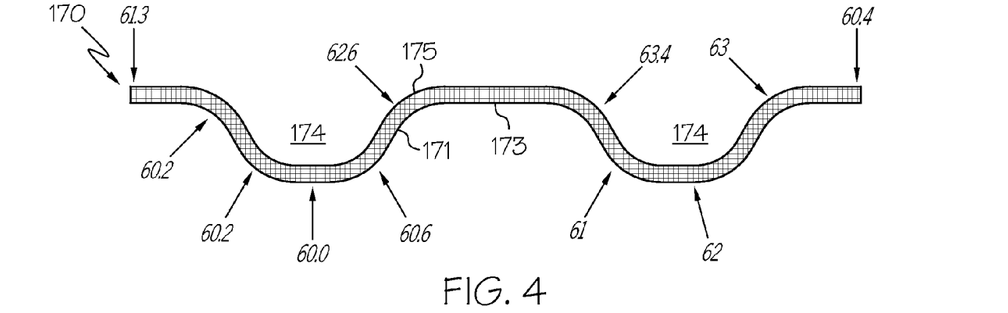
FIG. 4 is side elevation view of the sheet of FIG. 3 once it has been subjected to a forming step in a die in accordance with the present invention such that formation-induced thinning along the surface thereof is reduced.
Figure 9:
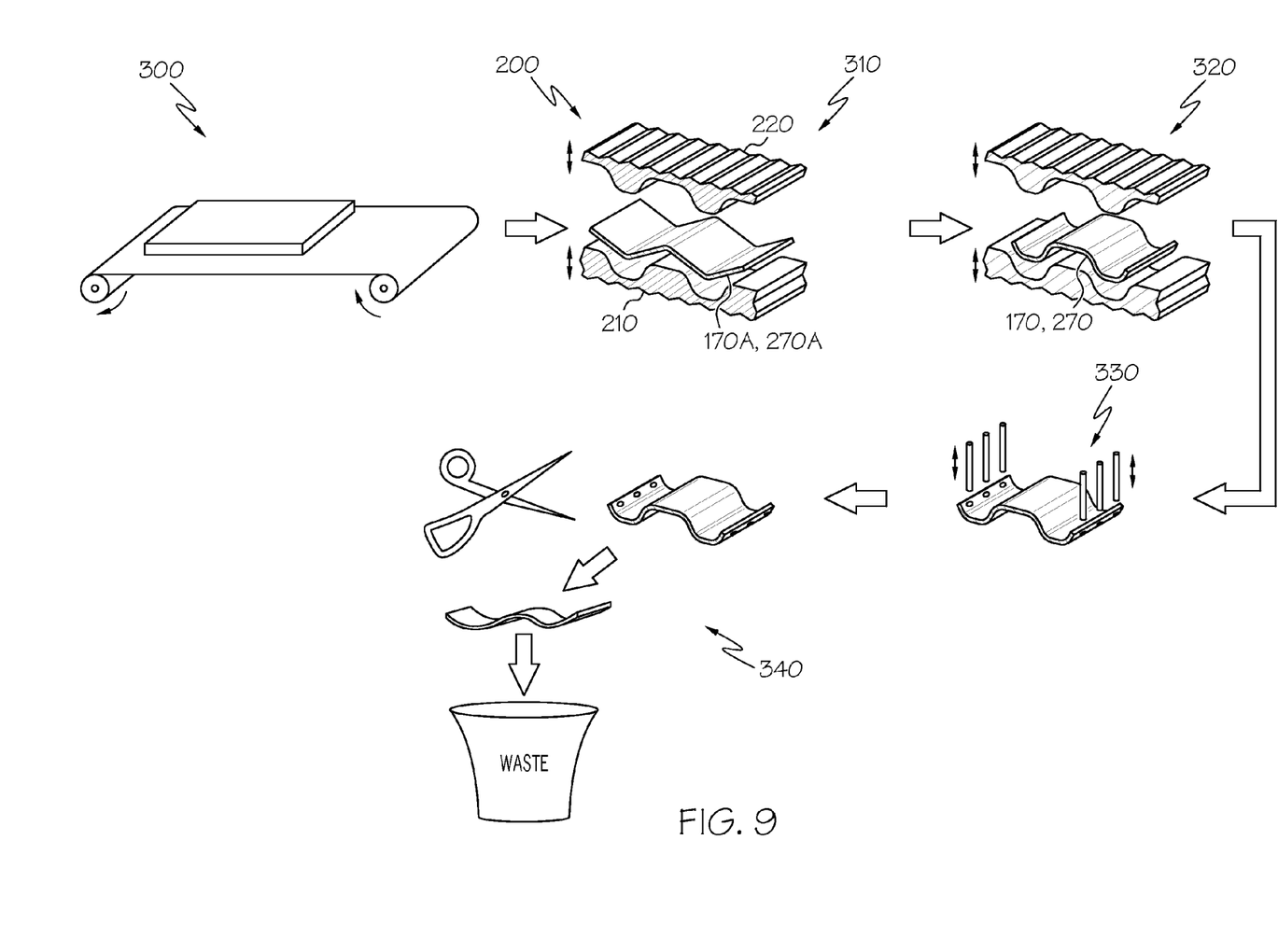
FIG. 9 shows the various steps used in the progressive formation of a bipolar plate according to an aspect of the present invention.

Referring next to FIGS. 3, 4 and 9, the results of a two-step forming process (FIGS. 3 and 4), as well as the steps used in preparing a bipolar plate (FIG. 9) according to an aspect of the present invention are shown. These include first preparing a pre-form sheet 170A (FIG. 3), and second subjecting the sheet 170A to stamping or related deformation in a die or related bipolar plate forming apparatus (not shown)) such that by this second deformation is converted into a shape suitable for use a bipolar plate 170 (FIG. 4). The pre-form shape of FIG. 3 defines a generally triangular cross-sectional profile, while the final form of FIG. 4 defines a serpentine shape with trapezoidal features. In a preferred form, the sheet 170A is made from a ferritic or austenitic stainless steel alloy where corrosion-inhibiting materials (such as chromium, nickel, molybdenum, copper or the like) are added to the iron base. By way of example, the ferritic stainless steel may contain chromium and (possibly up to about 30 weight percent) with substantially no nickel. Likewise, an austenitic stainless steel may contain between about 16 and 26 weight percent chromium and about 8 to 22 weight percent nickel, where well-known examples include the American Iron and Steel Institute (AISI) Type 304 and Type 316 varieties. Other alloys, such as iron-nickel alloys, will less likely be used for the base material because of their lack of corrosion resistance.

By the present approach, the initial pre-forming step followed by the forming step promotes the selective movement of the sheet material such that the overall operation keeps a deviation from the nominal thickness of the original sheet to a minimum. In the present context, such selective movement corresponds to the localized transfer of discrete portions of the material that makes up the initially-flat original sheet to adjacent sheet regions. In a more particular form (as will be discussed in more detail below), such discrete portions may coincide with those areas in or around where bends that define the channels are formed. One advantage associated with the approach of the present invention is achieved because the V-shaped preform 170A shown in FIG. 3 includes bends or related deformations to the sheet at both the portion that will (upon final forming) include the land 74 (as shown in FIG. 1), as well as at the portion that will define the bottom of the channel 72 (also as shown in FIG. 1). In comparison, the one-step forming of the known art is such that the material making up the original sheet does not experience enough plastic deformation; this in turn leads to undue necking, thinning and related large deviations from the original nominal thickness. Another advantage associated with the present invention is that the V-shape preform design 170A increases the original sheet length of line prior to the sheet going into the final forming tool die while keeping the thickness change of the V-shape's straight (i.e., diagonal) walls 171A uniform and minimal. A further advantage comes from apexes 173A in the bent areas of the preform feed additional metal to the bending radii 175 that are shown in the final form of FIG. 4; this movement or feeding of additional material is useful in reducing the stretching or pulling of the metal from the wall area 171 of the final form 170. These features all help form a deeper channel with less thinning and necking. In other words, the preform design allows the stretch to occur across a longer length of material than if the same deformations were imparted to the sheet in a single-step forming process where any stretching is highly localized. Because the material is not conducive to this amount of localized stretch, the preform approach of the present invention moves the metal only a part of the way while minimizing stretch; this then allows the final form to complete the desired final geometry without the exceeding local material properties.

In essence, the first step of the two-step approach disclosed herein pre-stretches the sheet of material, and more particularly performs this pre-stretching at fracture-vulnerable regions of the formed bipolar plate. In the embodiment depicted, the draw depth D of the tooling corresponding to the formation of the pre-form sheet 170A is 350 microns (although it will be appreciated by those skilled in the art that other depths may be employed, depending on the desired dimensions of the resulting reactant channels), while the lateral channel repeat length L is 1.6 millimeters. Likewise, the draw depth of the tool used to make the final bipolar plate shape is 365 microns. Furthermore, in situations where austentic (rather than ferritic) stainless steel is used (for example, where one or both of the draw depths is over about 400 microns), a same preform tool can be used and different preform draw shapes can be obtained by adjusting the draw depth (punch stroke); such an approach may help to reduce tool redundancy and related costs.

The surface of the sheet 170A that will subsequently be formed into bipolar plate 170 is undulated such that it defines a generally wavy, repeating serpentine pattern made up of a continuous length of stainless steel material that includes a repeating pattern of side walls 171 and bends (now in the shape of lands similar to that depicted in FIG. 1) 173 that meet at intersection 175. The V-shaping may optionally include a generally flattened-out region 173A; this helps promote proper alignment of the preformed sheet 170A in the final form die. In this way, the sheet 170A can tolerate potentially large misalignment relative to the tool 200 (shown later) while preserving the desired final form. The equivalent structure is discussed in more detail below and shown with particularity in FIG. 6, where finished bipolar plate 270 mimics the other remaining features of finished bipolar plate 170 of FIG. 4. The enhanced alignment helps provide a better transition from the feed region to the active area. Moreover, such a configuration reduces (and therefore, better controls) elastic deformation springback of the material making up sheet 170A after the forming operation because it provides additional plastic deformation in the preform stage. In another particular form, the side walls 171 are generally straight. In yet another form, the V-shape defines a wide-open angle to allow relatively large misalignment of the sheet 170A and the tool 200 in the final forming process. Preferably, the range of this angle is between 114 degrees and 120 degrees for normal bipolar plate 170 channel designs. In still another form, the channels formed by the side walls 171 and bends 173 of sheet 170A may include a large pre-form draw depth to match final form depth as closely as possible (and will be compatible with the depth dictated by the depth of the die of the tool); such a configuration will result in large plastic deformation. Likewise, a small punch radius may be used to stretch and deform the corners of the channel areas that generally coincide with the intersections 175 of the finally-formed bipolar plate 170 that otherwise cannot sustain enough plastic deformation in the final form due to the low strain hardening rate (and consequent tendency to stretch out and become too thin) of ferritic stainless steel material. The disclosed invention will allow the sheet being used to form the bipolar plate 170 to provide a substantially uniform thickness distribution at the end of final form channel geometries without necking and fracture. Such an approach is suitable for both ferritic and austenitic stainless steels.

Referring with particularity to FIG. 4, significant reductions in localized thinning are shown relative to the one-step approach of the prior art, showing with particularity an even distribution of the thickness (shown italicized in microns) across the surface with a maximum reduction in thickness of about 20% (more particularly, 20.5%) at location 173 that corresponded to bend 173A of sheet 170A for a draw depth of the final forming stage of 350 microns for a ferritic stainless steel sample with an initial thickness of 75 microns. This optimum result took into consideration various pre-form shapes and dimensions, including the land width from 0 millimeters to 0.4 millimeters, apex radii of curvature between 0.24 millimeters and 0.4 millimeters, and a depth of draw between 320 microns and 350 microns. Likewise, this optimum design was repeated for a final forming stage of 365 microns, and produced a maximum reduction in thickness of about 23.2% at a location (not shown) that corresponded to the intersection of the bend and straight side walls. Compared to the single-step approaches discussed above, the optimized thickness deviation reduction is approximately 50% better than that of FIG. 2's best-performing sheet 70C, and about 67% for the worst-performing sheet 70B.

Referring with particularity to FIG. 9, the steps 300 used to form a bipolar plate are shown. Initially, a generally flat sheet S is fed (such as by continuous conveyor or other known means) into a pre-form set of dies 210, 220. The operation of the dies 210, 220 in the first shaping step 310 ensures that a generally undulated pre-form shape 170A, 270A (the former of which is similar to that depicted in FIG. 2) is formed. From there, a second shaping step 320 puts them into their final shape. Although shown notionally as having the same general shape, the dies 210, 220 used in the pre-form step 310 are different from those used in the second step used in the final forming. As will be appreciated by those skilled in the art, both the pre-form and final die sets are engineered for the particular part function and material type. Thus, alternate part designs or material type may require a slightly different shape/design, and such sets may be modified accordingly. From these two shaping steps, step 330 may be used to form additional bipolar plate features, such as piercing of internal features, port openings or the like. Such pierced features may include header openings to distribute fluids to a finished the stack assembly (not shown), while port (i.e., anode and cathode) openings provide pathways for reactant fluids to enter or exit each cell. Other features, such as openings to create or support the datum structure for assembly and other knockouts to facilitate assembly and integration (for example, to facilitate cell voltage monitoring) may also be formed. After that, an additional step 340 may be used to provide cutting, trimming, perimeter piercing or related separation of excess to be discarded. For example, the last station that corresponds to step 340 may be used to punch away the perimeter material to cut the finished plate 170, 270 out of the strip for collection to a downstream assembly. As will be appreciated by those skilled in the art, an apparatus used to form the final shape bipolar plate 170, 270 may include these and other various fabricating stages such that all are integrated into a single forming tool or machine. Both the preform step & die (that corresponds to the first shaping step 310) and the final form step & die (that corresponds to the second shaping step 320) have radii cut into the general shape of the tooling to prevent tearing of the fully-formed bipolar plates 170, 270. Thus, as noted above, while the preform shapes of FIG. 3 and the first stage of FIG. 6 generally define a more of triangular cross-sectional shape, the final form (such as that depicted in FIG. 4 and the last stage of FIG. 6) defines more of a trapezoidal shape. In either event, both sections are blended and smoothed at corners to minimize stress concentration factors and related stress risers. As such, sharp transitions, corners or the like are avoided as being less than optimal for stamping operations such as those imparted in shaping steps 310, 320.

Figure 5:
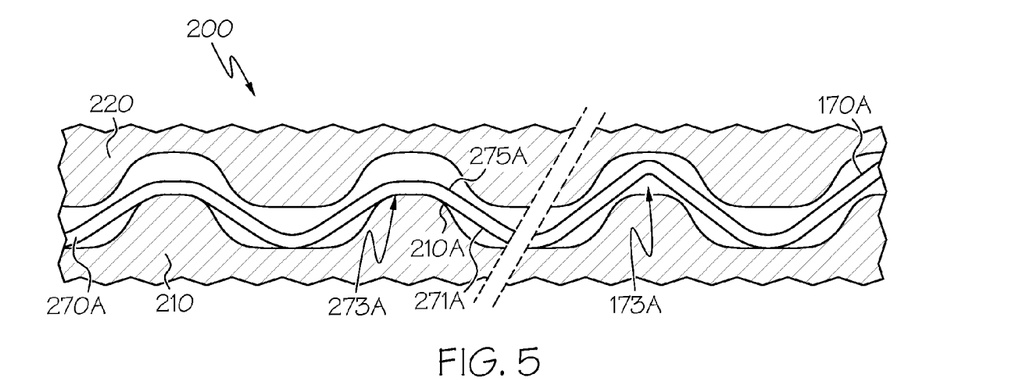
FIG. 5 shows a side-by-side comparison of two different embodiments of a sheet made in accordance with the disclosed invention, where the right side shows the sheet of FIG. 3 and the left side shows a modified version where the generally V-shaped bends formed in the serpentine pattern of the sheet have been flattened at their apex in the pre-formed shape prior to placement in the bipolar plate forming apparatus.

Referring next to FIGS. 5 through 7B, a variation on the pre-form sheet 170A may be used to reduce the chance of misalignment with the dies used as part of the bipolar plate forming apparatus. Because increased misalignment can be a significant contributor to higher degrees of maximum thinning, it would be advantageous to create a pre-form sheet that reveals a tendency to self-correct. Referring with particularity to FIG. 5, one way that the alignment may be improved is by promoting a more conformal fit between the apex at the bend 173A of sheet 170A and the top of the bottom die 210. A comparison between one form of the sheet 170A and an optional form 270A is shown on the right and left, respectively. Sheet 270A includes a flattened region at bend 273A whereas the bend 173A of sheet 170A has a more pronounced (i.e., sharper) V-shape. This flattened region is generally coincident with the shape of shoulder 210A of bottom die 210. This shaping allows thickness strain to be slightly more evenly distributed along the arc length of the channel (as dictated by the repeating length defined along the surface by the side wall 271A, the bend 273A and the intersection 275A. This also reduces the chance of misalignment between the sheet 270A and the bottom die 210, thereby making it possible to form a bipolar plate 270 with a deep channel design. In one form, the nominal thickness of a ferritic stainless steel sheet 270A is 75 microns, although it will be appreciated by those skilled in the art that other thicknesses may be used. As with the V-shape design mentioned above in conjunction with FIGS. 3 and 4, this modified pre-form design of sheet 270A also has self-adjustment capability for relatively large lateral misalignment. This modification of the pre-form design of sheet 270A will slightly change the angle of the bend 273A; however, this has very little effect on the formability of both the pre-form of sheet 270A and the final bipolar plate 270. With the optional design that corresponds to pre-form sheet 270A, large amounts of lateral misalignment (for example, by about 200 to 400 microns) relative to the bottom die 210 of tool 200 may tend to realign as the deformation of the sheet progresses.

Figure 6:
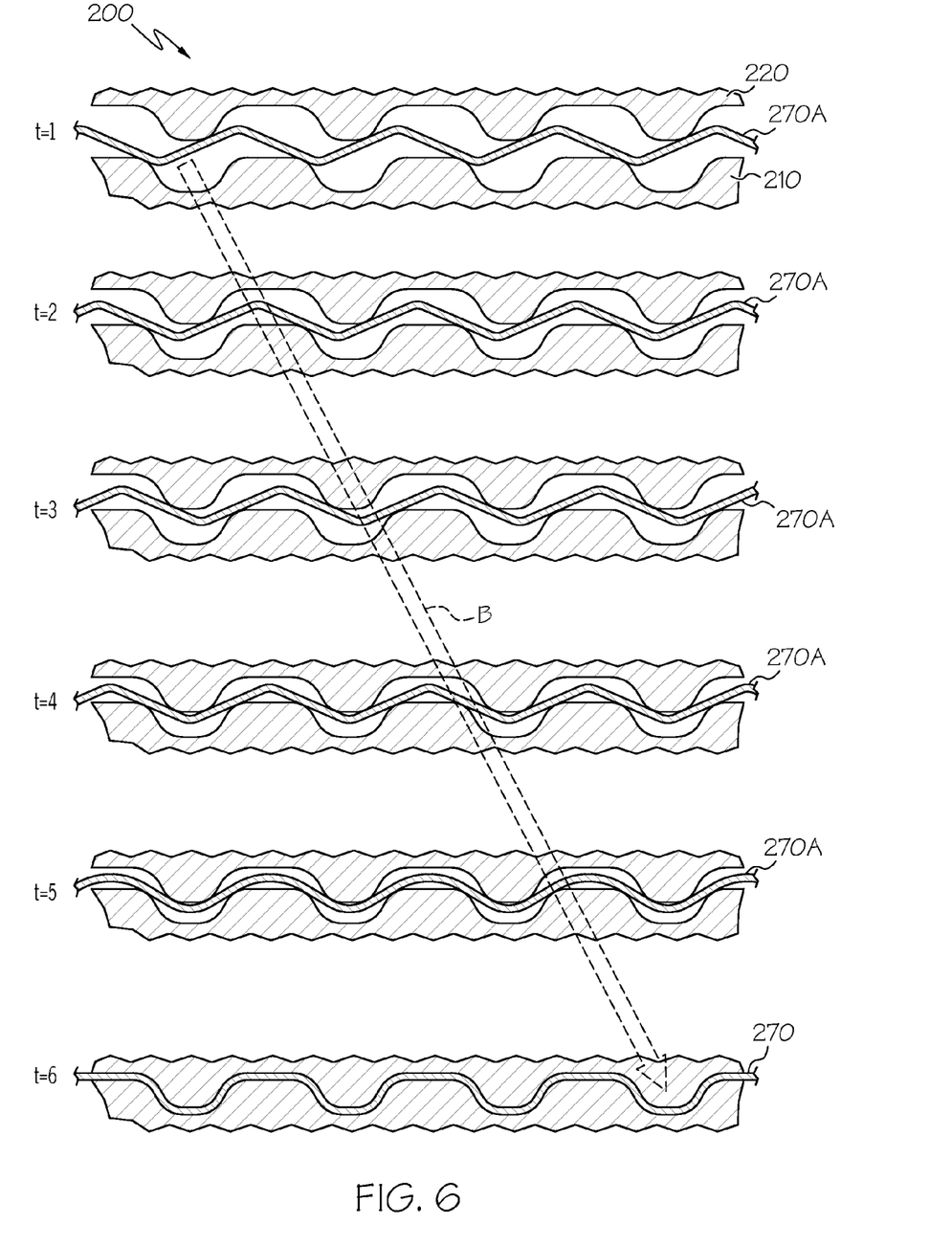
FIG. 6 shows how the pre-formed sheet self-adjusts in the bipolar plate form apparatus, even when exposed to a 400 micron lateral misalignment over the course of several snapshots of a forming time sequence.

Referring with particularity to FIG. 6, the position of the blank of sheet 270A (which could also be applied to the sheet 170A of FIG. 3) is shown with a tendency to self-adjust as it moves down; this is shown by arrow B as the bottom and top dies 210 and 220 close in upon one another corresponding to times t1 through t6. Significantly, the forming takes place between the aligned sheet 270A (or 170A) and the bottom die 210; this in turn keeps the thinning relatively uniform. While the misalignment shown is particularly pronounced (for example, approximately 400 microns), it will be appreciated that lesser degrees or misalignment are equally resolvable. Significantly, this self-alignment ensures that the work-hardening that was previously performed on the pre-formed sheet 270A (or 170A) reduces the chance for necking, thinning or the like. The final shape 270 of FIG. 6 analogizes the final shape 170 of FIG. 4.

Figure 7:
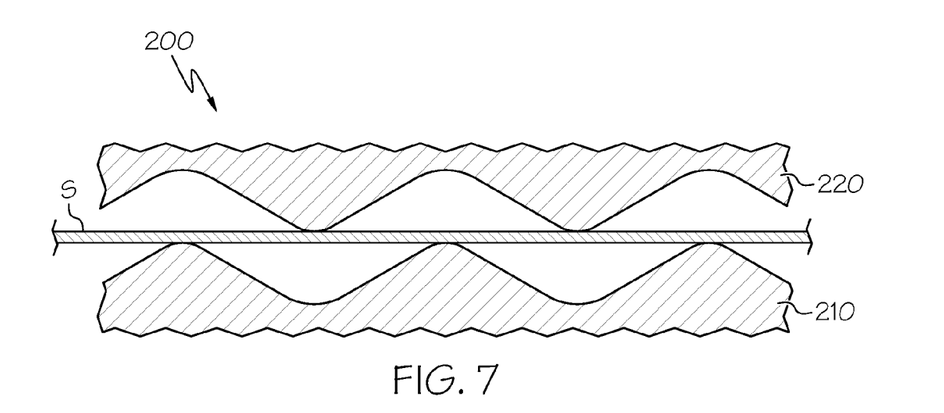
FIG. 7 shows a nominal 75 micron thick pre-form sheet with a 305 micron pre-form draw depth showing a maximum thickness deviation of 15.3% near the apex.
Figure 7A:
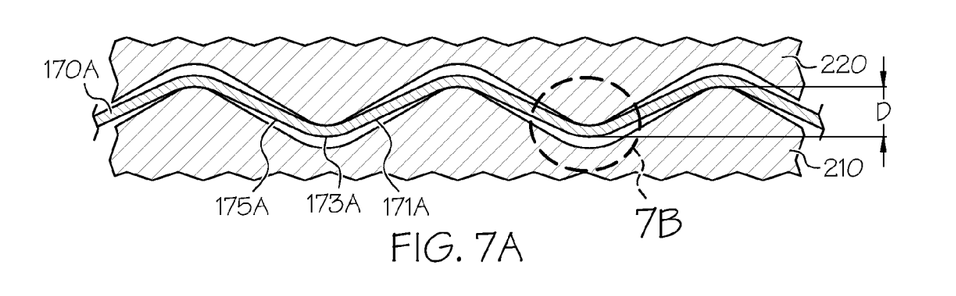
FIGS. 7A and 7B show the pre-form sheet of FIG. 7 being subjected to deformation under dies of the tool of the present invention such that they are converted into pre-form sheet with a shallower draw depth.
Figure 7B:
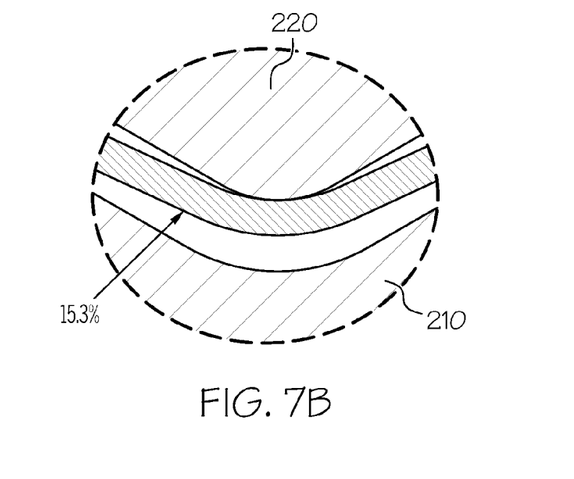

Referring with particularity to FIGS. 7, 7A and 7B, a pre-form sheet is shown, along with its conformal positioning relative to a comparably-shaped bottom die 210. A sheet S (in FIG. 7) is subjected to deformation under dies 210 and 220 of tool 200 such that they are converted into pre-form sheet 170A (in FIG. 7A) with a shallower draw depth D of 305 microns versus the 350 micron depth of the previous version. In this example, the maximum thinning took place around the apex of the V-shaped bend, and was no more than 15.3% (as shown with particularity in FIG. 7B). It will be appreciated that the same preform tool design used for a 350 micron depth (such as that discussed above in conjunction with FIGS. 3 and 4) can be also used in tools employing shallower preforms, where in another trial (not shown), the present inventors used the same preform design to produce a maximum thinning of 19% in a region generally similar to that of side wall 171 in FIG. 4.

Figure 8A:
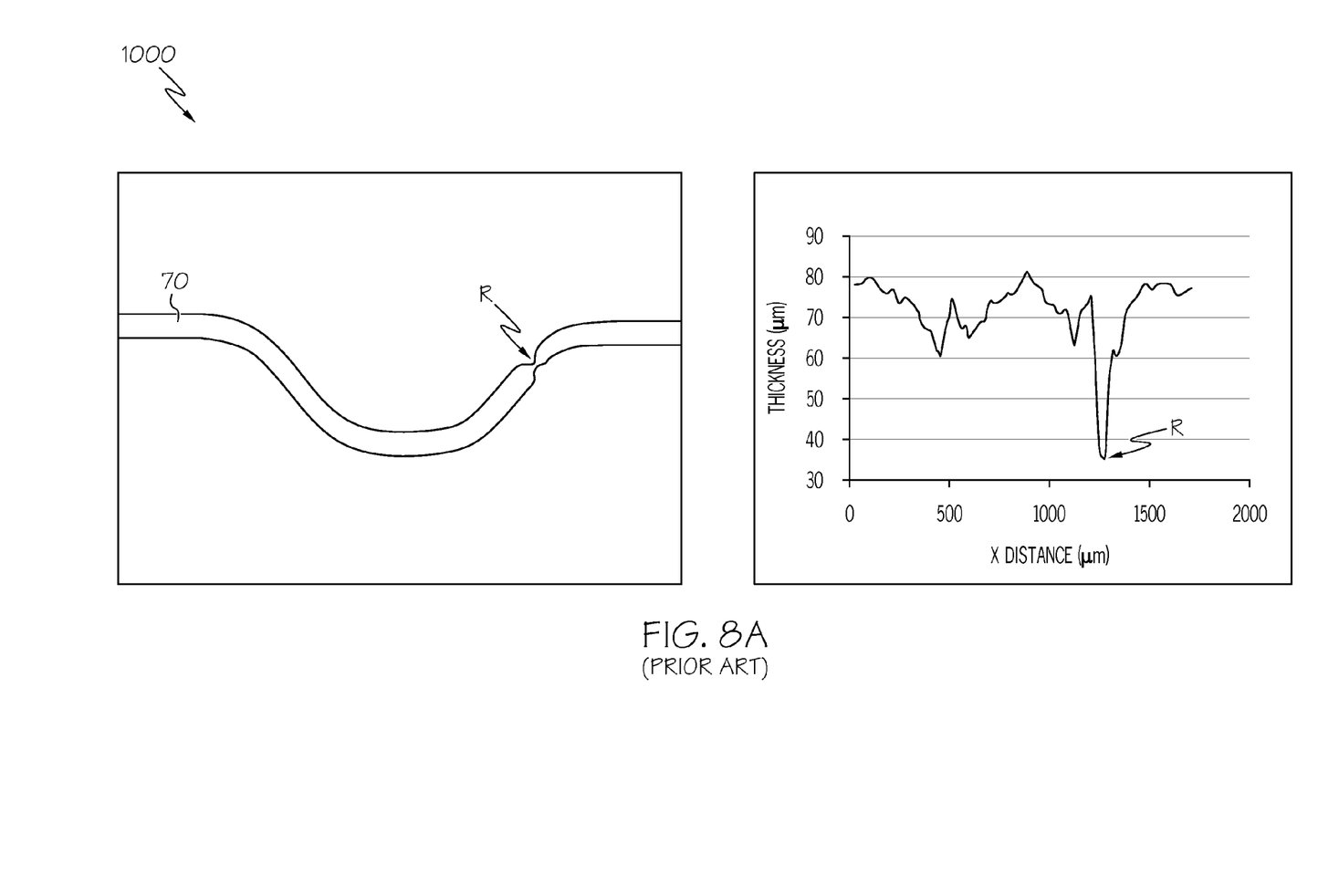
FIG. 8A shows the results of a one-step forming process of a nominal 75 micron thick pre-form sheet with a 365 micron designed draw depth of the prior art.
Figure 8B:
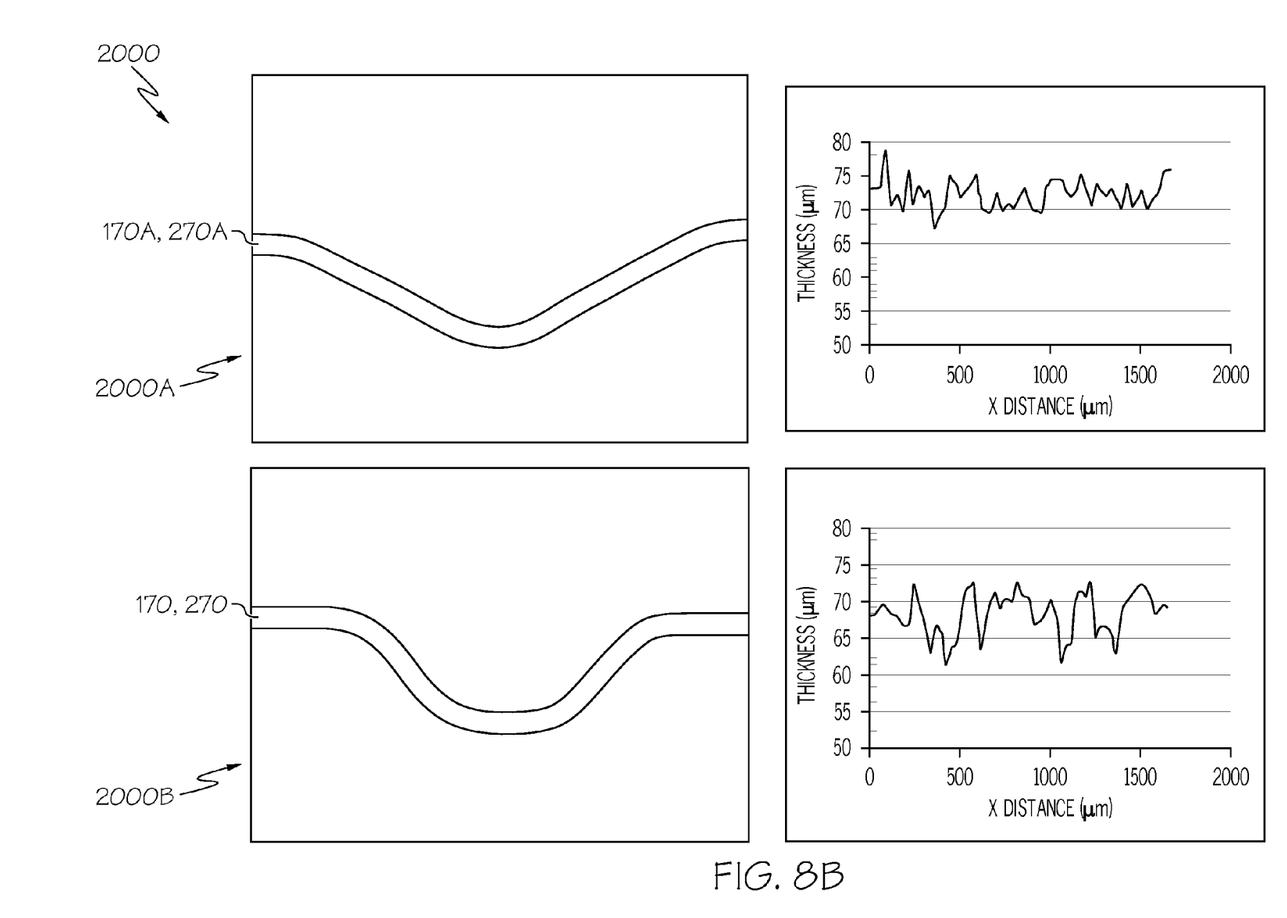
FIG. 8B shows the results of a two-step forming process according to an aspect of the present invention involving a nominal 75 micron thick pre-form sheet with a 365 micron draw depth according to an aspect of the present invention.

Referring next to FIGS. 8A and 8B, a comparison between a prior art one-step forming process 1000 (FIG. 8A) and a two-step forming process 2000 according to the present invention (FIG. 8B) that is made up of a pre-forming step 2000A and a forming step 2000B is shown. In both cases, a nominal 75 micron thick sheet is subjected to forming to convert the sheet into a respective bipolar plate with a 365 micron draw depth. In the prior art process 1000, the conversion of a flat sheet into the bipolar plate exhibits a necking-induced thickness reduction R at a location (corresponding to about 1300 microns from the left end) of greater than 50% of its 75 micron original thickness; such a reduction is indicative of significant compromise in plate structural capacity. By contrast, the conversion of the sheet to the bipolar plate according to the process 2000 of an aspect of the present invention shows in both the conversion from a flat sheet to the pre-formed sheet, as well as from the pre-formed sheet to the final bipolar plate thickness reductions of no more than about 20%. The more gradual pre-stretching movement of the material made possible by the pre-forming step (along with the optional flattening of the bend apex discussed above) helps push or relocate material to other locations within the pre-form sheet 170A, thereby resulting in less stretching in the final forming operation of the second step. It will be appreciated by those skilled in the art that the preform depth does not have to be same as final form as long as it can reduce the thinning in the final draw to the design requirement. In one preferred form, the depth of the preform is determined based on computer simulation. Moreover, the final form quality is not very sensitive to minor variations in preform depth variations inherent in the manufacturing process.

A fuel cell made in accordance with an embodiment of the present invention may be part of a larger fuel cell stack, which may in turn form at least a portion of a propulsion system for a vehicle, such as car. The fuel cell stack may be configured to provide at least a portion of the motive or related propulsive needs of the vehicle. It will also be appreciated by those skilled in the art that other vehicular forms may be used in conjunction with the fuel cell stack; such vehicles may include a truck, motorcycle, aircraft, spacecraft or watercraft.

Unless otherwise indicated, all numbers expressing quantities are approximations that may vary depending on the desired properties sought to be obtained in embodiments of the present invention. As such, they may all be understood to be modified by the approximation "about". It is likewise noted that terms such as "preferably," "commonly," and "typically" are not utilized herein to limit the scope of the claimed invention or to imply that certain features are critical, essential, or even important to the structure or function of the claimed invention, but rather to highlight alternative or additional features that may or may not be utilized in a particular embodiment of the present invention. Furthermore, the term "substantially" is utilized herein to represent the inherent degree of uncertainty that may be attributed to any quantitative comparison, value, measurement, or other representation, and as such may represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of preparing a stainless steel bipolar plate for a fuel cell, said method comprising:
   configuring a bipolar plate forming apparatus to progressively form said bipolar plate, said progressively forming comprising:
      using a first shaping step to pre-form a sheet of stainless steel such that a portion of the material making up said sheet is selectively moved, said pre-formed sheet defining a nominal thickness and a plurality of undulations representative of bipolar plate reactant channel flowpaths therein; and
      using a second shaping step to change the shape of said pre-formed sheet such that a maximum deviation from said nominal thickness as a result of said first and second shaping steps is substantially reduced relative to formation of a bipolar plate from a single-step forming process; and
   providing said sheet to said bipolar plate forming apparatus such that upon operation of said bipolar plate forming apparatus on said sheet, the shape of said sheet is substantially converted into that of said bipolar plate.

2. The method of claim 1, wherein said stainless steel used in said bipolar plate comprises an austenitic stainless steel.

3. The method of claim 1, wherein said stainless steel used in said bipolar plate comprises a ferritic stainless steel.

4. The method of claim 1, wherein said selectively moved material corresponds to discrete portions of said sheet that substantially coincide with locations therein where at least one of a land and said channel are subsequently formed.

5. The method of claim 4, wherein said discrete portions will, upon formation by said first shaping step, define a substantially V-shape.

6. The method of claim 5, wherein said substantially V-shape defines a flattened region at the apex thereof.

7. The method of claim 4, wherein an angle defined at the apex of said substantially V-shape is between about 114 degrees and 120 degrees.

8. The method of claim 3, wherein a depth of draw of said changing the shape is at least about 350 microns.

9. The method of claim 8, wherein said pre-formed sheet defines a pre-form draw depth sufficient to substantially match a final form depth.

10. The method of claim 1, wherein said maximum deviation from said nominal thickness is less than about twenty percent.

11. The method of claim 1, wherein said reduced maximum deviation corresponds to an attendant decrease in thinning and necking in regions of said sheet that correspond to said channel.

12. A method of preparing a bipolar plate for a fuel cell, said method comprising:
   using a first shaping step to form a substantially planar sheet of ferritic stainless steel into a substantially non-planar serpentine pattern shape, wherein said substantially planar sheet defines a nominal thickness substantially throughout the portion of its surface that defines said bipolar plate; and
   using a second shaping step to form said serpentine pattern into a bipolar plate such that upon creation thereof, it defines a substantially constant wall thickness with a substantial reduction in deviation from said nominal thickness relative to formation of a bipolar plate from a single-step forming process.

13. The method of claim 12, wherein each of said first and second shaping steps comprise stamping.

14. The method of claim 13, further comprising reducing the likelihood of misalignment between said serpentine pattern and a tool used to perform said stamping by providing a flattened region around the apex of each of a plurality of substantially V-shaped peaks that are formed in said serpentine pattern.

15. The method of claim 14, wherein said reducing the likelihood of misalignment comprises self-adjusting said serpentine pattern prior to said second shaping step by placement of a flattened bend region therein into a bipolar plate forming apparatus with a lateral misalignment of up to about 400 microns.

16. The method of claim 12, wherein said reduction in deviation from said nominal thickness relative to formation of a bipolar plate from a single-step forming process is at least about 50%.

17. The method of claim 12, wherein a depth of draw associated with at least one of said serpentine pattern and said bipolar plate is between about 300 microns and about 400 microns.

18. A method of preparing a fuel cell, said method comprising:
   arranging a membrane electrode assembly to comprise an anode, a cathode and a membrane disposed between said anode and cathode such that a respective anode reactant and cathode reactant may be placed in fluid communication therewith; and
   placing a stainless steel bipolar plate that defines a plurality of flow channels therein in adjacent each of said anode and said cathode such that upon operation of said fuel cell, reactants introduced from a fuel source and an oxygen source respectively can be delivered to said anode and said cathode through said flow channels, said bipolar plates formed by:
      shaping a pre-formed sheet of stainless steel such that it defines a nominal thickness and a plurality of reactant channel flowpaths therein; and
      changing the shape of said pre-formed sheet such that a maximum deviation from said nominal thickness is substantially reduced relative to formation of a bipolar plate from a single-step forming process.

19. The method of claim 18, wherein said shaping said pre-formed sheet and said changing the shape of said pre-formed sheet is performed by a bipolar plate forming apparatus.

20. The method of claim 19, wherein said substantial reduction in said maximum deviation is at least about 50%.

21. The method of claim 19, further comprising reducing the likelihood of misalignment of said pre-formed sheet and said bipolar plate forming apparatus by providing a flattened region about an apex formed in each of a plurality of substantially V-shaped peaks that define a serpentine pattern in said pre-formed sheet.

22. The method of claim 18, wherein said stainless steel used in said bipolar plate comprises a ferritic stainless steel.

* * * * *